United States Patent
Muruganantham (10) Patent No.: US 10,508,584 B2
(45) Date of Patent: Dec. 17, 2019

(54) USE OF INSULATING PAINT ON EXHAUST AFTERTREATMENT SYSTEM COMPONENTS

(71) Applicant: Cummins Emission Solutions, Inc., Columbus, IN (US)

(72) Inventor: Karthik Muruganantham, Stoughton, WI (US)

(73) Assignee: Cummins Emission Solutions, Inc., Columbus, IN (US)

(*) Notice: Subject to any disclaimer, the term of this patent is extended or adjusted under 35 U.S.C. 154(b) by 442 days.

(21) Appl. No.: 15/000,148

(22) Filed: Jan. 19, 2016

(65) Prior Publication Data

US 2016/0215675 A1 Jul. 28, 2016

Related U.S. Application Data

(60) Provisional application No. 62/106,513, filed on Jan. 22, 2015.

(51) Int. Cl.
*F01N 13/14* (2010.01)
*F01N 3/021* (2006.01)
*F01N 3/20* (2006.01)
*B01D 53/94* (2006.01)

(52) U.S. Cl.
CPC ......... *F01N 13/14* (2013.01); *B01D 53/9477* (2013.01); *F01N 3/021* (2013.01); *F01N 3/2066* (2013.01)

(58) Field of Classification Search
None
See application file for complete search history.

(56) References Cited

U.S. PATENT DOCUMENTS

| | | | | |
|---|---|---|---|---|
| 6,006,516 A | * | 12/1999 | Voss | B01D 53/944 29/890 |
| 6,077,483 A | * | 6/2000 | Locker | B01J 19/02 422/179 |
| 2008/0127638 A1 | * | 6/2008 | Vaarkamp | F01N 3/035 60/297 |
| 2009/0060800 A1 | * | 3/2009 | Fernandes, Jr. | B01D 46/2422 422/168 |

(Continued)

FOREIGN PATENT DOCUMENTS

DE 102010009605 A1 * 9/2011 ............. F01N 3/208
WO WO-9853113 A1 * 11/1998 ......... B60R 13/0876

OTHER PUBLICATIONS

Machine translation of WO-9853113-A1, Nov. 1998.*

(Continued)

*Primary Examiner* — Walter D Griffin
*Assistant Examiner* — Jelitza M Perez
(74) *Attorney, Agent, or Firm* — Foley & Lardner LLP (57) ABSTRACT

An apparatus includes an exhaust aftertreatment component. According to various embodiments, the exhaust aftertreatment component is any of a diesel oxidation catalyst, a diesel particulate filter, a decomposition reactor tube, a selective catalytic reduction device, and a reductant injector assembly. The apparatus also includes a ceramic thermal barrier coating applied to a surface of the exhaust aftertreatment component. The surface may, for example, be an outer wall of a housing of the exhaust aftertreatment component.

26 Claims, 6 Drawing Sheets

(56) References Cited

U.S. PATENT DOCUMENTS

| | | | |
|---|---|---|---|
| 2010/0242448 A1* | 9/2010 | Mital | F01N 3/033 60/286 |
| 2013/0219871 A1* | 8/2013 | Crandell | F01N 3/2066 60/295 |
| 2014/0237998 A1* | 8/2014 | Fahrenkrug | F01N 3/2066 60/301 |

OTHER PUBLICATIONS

Dictionary.com—"coated" definition. https://www.dictionary.com/browse/coated (Year: 2012).*
Huethwohl, G. DE102010009605A1—Translated document (Year: 2010).*
Ryan Gehm, "Thermal barrier coating from Zircotec takes heat off of heavy-duty diesels", SAE International, (http://articles.sae.org/9879/), dated Jun. 7, 2011.
Smith, et al. "Comparative testing of coated and uncoated exhaust manifolds using ThermoHold™ ceramic thermal barrier coating", Release 2, Zircotec, dated Nov. 2007.

* cited by examiner

USE OF INSULATING PAINT ON EXHAUST AFTERTREATMENT SYSTEM COMPONENTS

CROSS-REFERENCE TO RELATED APPLICATIONS

This application claims priority to and benefit of U.S. Provisional Application No. 62/106,513, filed Jan. 22, 2015 and entitled "Use of Insulating Paint on Exhaust Aftertreatment System Components," the entire disclosure of which is incorporated herein by reference.

TECHNICAL FIELD

The present disclosure relates generally to the field of exhaust aftertreatment systems for internal combustion (IC) engines.

BACKGROUND

Conventional exhaust gas aftertreatment systems include any of several different components to reduce the levels of harmful exhaust emissions present in exhaust gas generated by an IC engine. For example, certain exhaust aftertreatment systems for diesel-powered IC engines include various components, such as a diesel oxidation catalyst (DOC), a diesel particulate filter (DPF), a decomposition reactor tube (DRT), a selective catalytic reduction (SCR) device, an SCR on filter (SCRF), and/or an ammonia slip catalyst (ASC) (also referred to as an ammonia oxidation catalyst (AMOX)). Each of the DOC, DPF, DRT, SCR device, SCRF, and/or the ASC components are configured to perform a particular exhaust emissions treatment operation on the exhaust gas passing through or over the respective components.

In operation, heat from the exhaust gas passing through the various exhaust aftertreatment components can be transferred to various parts (e.g., housings) of the exhaust aftertreatment components. Such heat transfer decreases the temperature of the exhaust gas and increases the surface temperature of the exhaust aftertreatment components.

SUMMARY

Various embodiments relate to an apparatus including an exhaust aftertreatment component. A ceramic thermal barrier coating is applied to a surface of the exhaust aftertreatment component.

Various other embodiments relate to a method including providing a part to be assembled in an exhaust aftertreatment component. The part is coated with a ceramic thermal barrier coating. The exhaust aftertreatment component, including the coated part, is then assembled.

In some embodiments, an aftertreatment system comprises an oxidation catalyst (for example, a diesel oxidation catalyst) and a particulate filter positioned downstream of the oxidation catalyst. A decomposition reactor tube is positioned downstream of the particulate filter. A reductant injector assembly is operatively coupled to the decomposition reactor tube. A selective catalytic reduction device is positioned downstream of the decomposition reactor tube. The selective catalytic reduction device includes a catalyst formulated to decompose NOx gases included in an exhaust gas flowing through the aftertreatment system. A ceramic thermal barrier coating is applied to at least one of the oxidation catalyst, the particulate filter, the reductant injector assembly and the selective catalytic reduction device.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
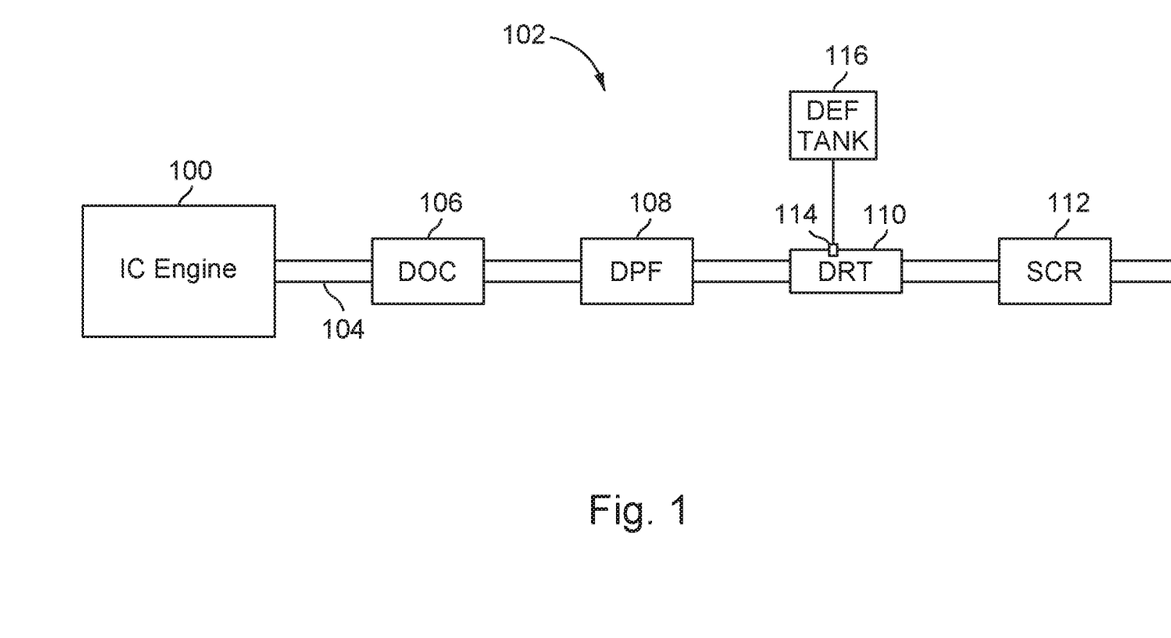
FIG. 1 is a block diagram illustrating an IC engine and an exhaust aftertreatment system operatively coupled to the IC engine.

FIG. 1 is a block diagram illustrating an IC engine 100 and a representative exhaust aftertreatment system 102 fluidly coupled to an exhaust manifold (not shown) of the IC engine 100 via an exhaust passage 104. The IC engine 100 can be a compression-ignited IC engine, such as a diesel or compressed natural gas fueled engine, or a spark-ignited internal combustion engine, such as a gasoline fueled engine. During operation, the IC engine 100 expels exhaust gas, which flows downstream from the IC engine 100 through the exhaust passage 104 and through the components of the aftertreatment system 102. Generally, the aftertreatment system 102 is configured to remove various chemical and particulate emissions present in the exhaust gas.

The exhaust aftertreatment system 102 may include an oxidation catalyst (for example, a DOC 106) and/or a particulate filter (for example, a DPF 108) positioned downstream of the DOC 106. The DOC 106 is generally configured to reduce the amount of CO and HC present in the exhaust gas via oxidation techniques, as well as to convert NO to $NO_2$ for passive regeneration of soot captured by the DPF 108. The DPF 108 is generally configured to filter harmful diesel particulate matter and soot present in the exhaust gas.

The exhaust aftertreatment system 102 may also include a DRT 110 positioned downstream of the DPF 108 and an SCR device 112 positioned downstream of the DRT 110. A reductant injector 114 is operatively coupled to the DRT 110. The reductant injector 114 is configured to inject a reductant (e.g., diesel exhaust fluid (DEF)) from the DEF storage tank 116. Once the DEF is injected into the DRT 110, the DEF is heated by the exhaust gas stream to trigger the decomposition of DEF into ammonia ($NH_3$) through hydrolysis.

The SCR device 112 is configured to convert $NO_x$ (NO and $NO_2$ in some fraction) within the exhaust gas stream into harmless nitrogen gas ($N_2$) and water vapor ($H_2O$). The $NO_x$ and the ammonia converted from DEF within the DRT 110 pass over a catalyst within the SCR device 112, and a catalytic reaction takes place in which $NO_x$ and ammonia are converted into $N_2$ and $H_2O$.

Exhaust aftertreatment components, such as the DOC 106, the DPF 108, the DRT 110, and the SCR device 112 typically include a housing that defines an interior cavity through which hot exhaust gas received from the IC engine passes and is treated by the component. Heat from the exhaust gas can be transferred to the housing, thereby decreasing the temperature of the exhaust gas and increasing the surface temperature of the housing.

Certain exhaust aftertreatment components operate most effectively at high temperatures or within a particular temperature range. Additionally, new emissions standards, such as the Euro IV standards, require IC engines to run hotter in order to meet the required emissions levels. However, specifications may define maximum external housing surface or "skin" temperatures. To that end, exhaust aftertreatment components are typically insulated to minimize heat transfer. For example, some exhaust aftertreatment components include a double-walled housing that includes an insulating air gap. Some components further include internal insulation positioned within the air gap. Additionally or alternatively, some components include external insulation wrapped around an outer wall of the component housing. Other components, such as the reductant injector 114, may be insulated using thinner insulation, to the extent possible, according to their configuration within the exhaust aftertreatment system 102.

Figure 2:
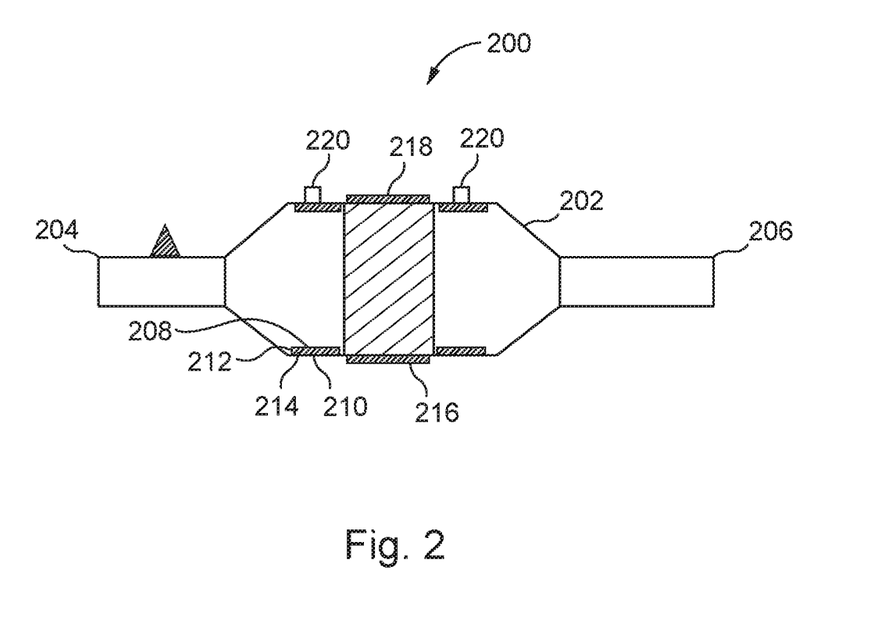
FIG. 2 is a cross-sectional view of an exhaust aftertreatment component illustrating a conventional insulation configuration.

FIG. 2 is a cross-sectional view of an exhaust aftertreatment component 200 illustrating a conventional insulation configuration. For example, the exhaust aftertreatment component 200 may be any of the components of the exhaust aftertreatment system 102 of FIG. 1, such as the DOC 106, the DPF 108, the DRT 110, or the SCR device 112. The exhaust aftertreatment component 200 includes a housing 202 defining an inlet 204 and an outlet 206. The exhaust aftertreatment component 200 is configured to be fluidly coupled to an exhaust passage of an IC engine (not shown) such that exhaust gas from the IC engine flows through the exhaust aftertreatment component 200 from the inlet 204 to the outlet 206. The housing 202 defines an inner wall 208 and an outer wall 210 spaced from the inner wall 208, thereby defining a gap 212 between the inner and outer walls 208, 210.

The exhaust aftertreatment component 200 includes both internal and external insulation to minimize heat transfer from the exhaust gas through the housing 202. As illustrated in FIG. 2, the exhaust aftertreatment component 200 includes internal insulation 214 packed in the gap 212. In some examples, the exhaust aftertreatment component 200 simply employs air within the gap 212 without including the internal insulation 214 in the gap 212. The internal insulation 214 may be fiber insulation, for example. The exhaust aftertreatment component 200 also includes external insulation 216 wrapped around the outer wall 210 of the housing 202. The external insulation 216 may be fiber insulation encapsulated by fabric or foil, for example. Each of the internal and external insulation 214, 216 may include various discrete segments positioned at different locations on the housing 202.

The exhaust aftertreatment component 200 also includes a heat shield 218 disposed around the outer wall 210 of the housing 202. The heat shield 218 may be formed using sheet metal (e.g., steel or aluminum sheeting), foil, or other materials. The heat shield 218 may be used, for example, to protect the housing 202 from excessive heat generated by other exhaust components in the same proximity. The exhaust aftertreatment component 200 further includes mounting brackets 220 that are utilized to attach the exhaust aftertreatment component 200 to a frame rail or other vehicle component.

There are several known challenges associated with utilizing fiber insulation with exhaust aftertreatment components, such as the internal and external insulation 214, 216 of the exhaust aftertreatment component 200 of FIG. 2. For example, internal fiber insulation, such as the internal insulation 214 of FIG. 2, may be prone to fiber migration. Fiber migration occurs, for example, due to friction by mating parts or due to contact with exhaust gas if the inner housing wall (e.g., the inner wall 208 of FIG. 2) does not fully shield the insulation from the exhaust gas. Fiber migration can result in reduced operational efficiency or complete component failure of exhaust aftertreatment components. For example, fibers may block pores of a catalyst, thereby obstructing exhaust gas flow.

Fiber insulation may also pose various manufacturing challenges. During assembly, internal fiber insulation must be stuffed or squeezed between the inner and outer housing walls, which may require specialized equipment and may be defect-prone. In addition, the various fiber insulation components included in an exhaust aftertreatment component increases the component's part number count, as well as corresponding costs due to procurement and storage.

With regard to the utilization of air gaps instead of fiber insulation, this arrangement typically suffers from the poor temperature reduction properties associated with the air gaps. In addition, moisture may be trapped in the air gap during the manufacturing process, which could cause structural failures due to expansion and contraction of the trapped gas in the enclosed volume.

The present disclosure is directed towards exhaust aftertreatment components including ceramic thermal barrier coatings. Ceramic thermal barrier coatings (e.g., a coating marketed by Zircotec under the ThermoHold™ trademark) are capable of significantly reducing heat transferred from surfaces on which the coating is applied. For example, certain tests have proven a surface temperature reduction of up to thirty-three percent for components coated with a ceramic thermal barrier coating compared to uncoated components. According to various embodiments, conventional insulation (e.g., fiber-based insulation) utilized in exhaust aftertreatment components may be reduced or eliminated by coating certain parts of the exhaust aftertreatment components with a ceramic thermal barrier coating.

In an embodiment, the ceramic thermal barrier coating includes a nickel-based bond coat and a zirconia-based top coat that is applied on top of the bond coat. According to an embodiment, the nickel-based bond coat is approximately 60% nickel and 40% aluminum by weight, and the zirconia-based top coat is approximately 50% titanium dioxide and 50% magnesium zirconate by weight. It should be understood that, as used herein "approximately" refers to and includes ±5%. To apply the ceramic thermal barrier coating to a component, the nickel-based bond coat is plasma sprayed onto the part to a thickness of approximately 100 µm. The zirconia-based top coat is then plasma sprayed on top of the base coat to a thickness of approximately 200 µm.

According to various embodiments, the ceramic thermal barrier coating is utilized with various materials. For example, the ceramic thermal barrier coating may be applied to sheet metal (e.g., steel or aluminum sheeting), cast metal (e.g., cast steel or cast aluminum), injection molded plastics, composite materials, and other types of materials. In some embodiments, the ceramic thermal barrier coating is applied to a part (e.g., a housing or a reductant injector mounting plate) prior to the part being assembled in an exhaust aftertreatment component. However, in other embodiments, the ceramic thermal barrier coating is applied to an assembled component.

According to various embodiments, exhaust aftertreatment components including ceramic thermal barrier coatings exhibit a number of advantages over conventional components that utilize fiber-based insulation. For example, manufacturing may be simplified by using parts with ceramic thermal barrier coatings, because some or all of the fiber insulation may be eliminated. Therefore, the manufacturing step to apply the fiber insulation may be eliminated, which improves manufacturing costs, inventory and procurement costs, potential defects related to the fiber insulation, etc.

Utilizing ceramic thermal barrier coatings also allows for complete coverage on parts having difficult geometries that preclude fully contiguous insulation coverage. For example, the exhaust aftertreatment component 200 of FIG. 2 has both internal and external insulation segments. Heat transfer may be higher at each of the interfaces between the segments, as the thermal insulation is not contiguous at those interfaces. Further, certain portions may simply not be covered by insulation. Unlike fiber-based insulation, the ceramic thermal barrier coatings can be applied across entire surfaces, including those with complex geometrical features, thereby eliminating interfaces and gaps between insulation coverage. Further, the ceramic thermal barrier coating may be applied to mounting components, such as the mounting brackets 220 of FIG. 2.

Ceramic thermal barrier coatings are also thinner than fiber insulation. Therefore, components using ceramic thermal barrier coatings may be smaller than those that utilize fiber-based insulation.

Figure 3A:
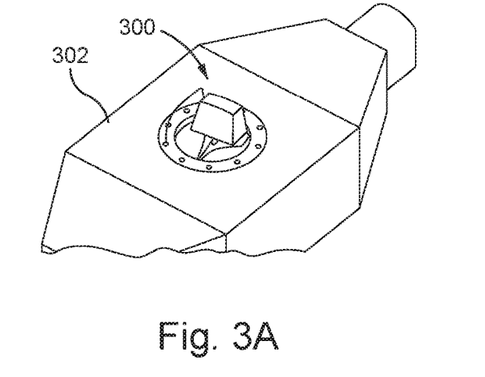
FIGS. 3A-3D illustrate a reductant injector assembly that is at least partially coated with a ceramic thermal barrier coating, according to various embodiments.

FIGS. 3A-3D illustrate a reductant injector assembly 300 that is at least partially coated with a ceramic thermal barrier coating, according to various embodiments. As illustrated in FIG. 3A, the reductant injector assembly 300 is configured to be operatively coupled to a DRT 302. As explained above in connection with FIG. 1, the reductant injector assembly 300 is configured to inject DEF received from a DEF storage tank into the exhaust gas stream passing through the DRT 302, where the DRT 302 is configured to decompose the injected DEF into ammonia through hydrolysis, so that the ammonia may be utilized by an SCR device downstream of the DRT 302.

Figure 3B:
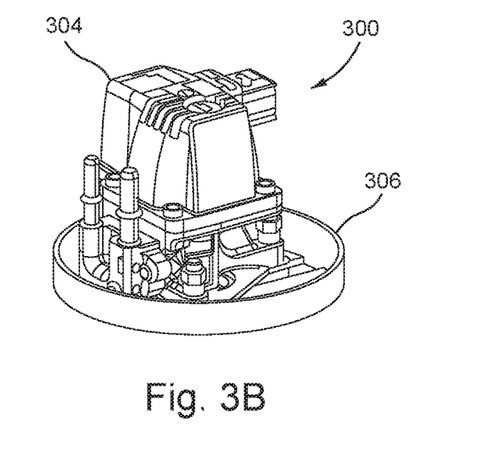
Figure 3C:
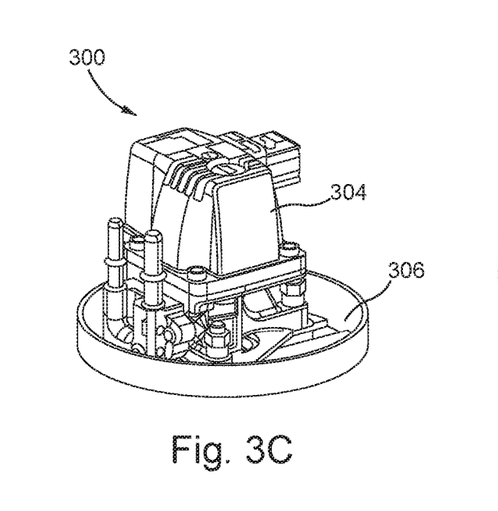
Figure 3D:
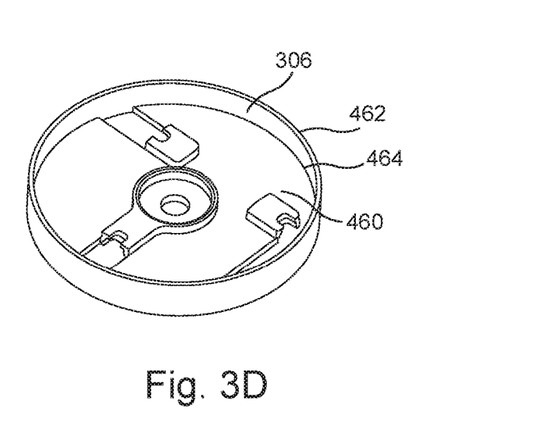

As illustrated further in FIGS. 3B-3D, the reductant injector assembly 300 includes an atomizer 304 that is mounted to an injector mounting plate 306. The injector mounting plate 306 is then mounted to the DRT 302 as illustrated in FIG. 3A to operatively couple the reductant injector assembly 300 to the DRT 302.

Figure 4A:
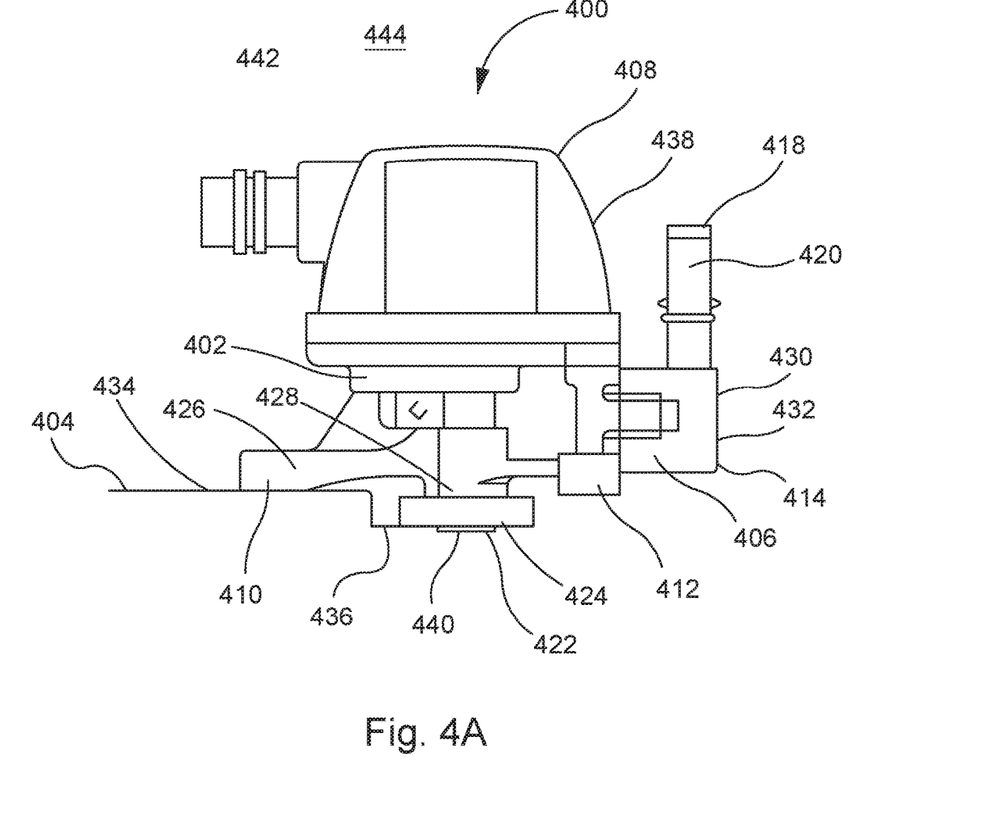
FIG. 4A illustrates various locations on a DEF injector assembly at which individual maximum temperature requirements may be specified.
Figure 4B:
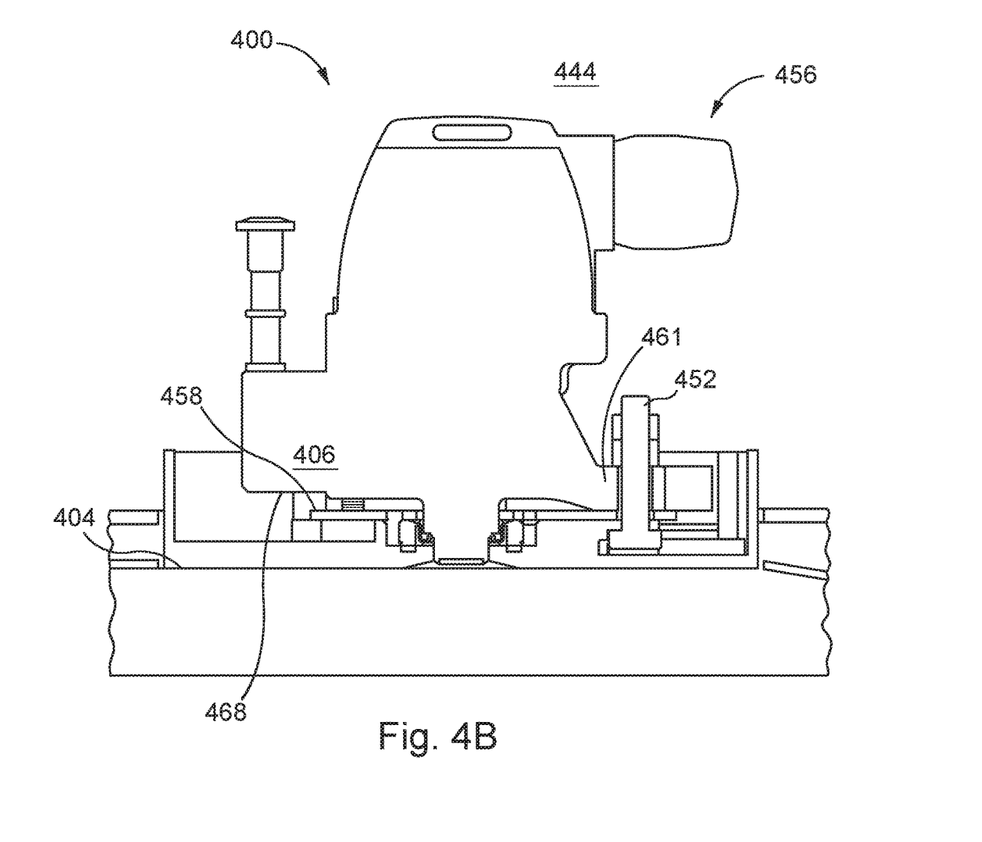
FIG. 4B illustrates various modes of heat transfer to the DEF injector assembly of FIG. 4A.

FIGS. 4A and 4B illustrate a DEF injector assembly 400, according to an embodiment. DEF injector assemblies have different operating temperature requirements at different locations on a DEF injector assembly. The DEF injector assembly 400 generally includes a DEF injector 402 mounted to a mounting plate 404. The DEF injector 402 includes a body 406 and a top cover 408 attached to the body 406. According to an embodiment, the body 406 is formed from metal, such as cast or machined aluminum or steel. The DEF injector 402 is attached to the mounting plate via fasteners (not shown), such as screws or bolts that extend through apertures in a foot 410 and in a mounting boss 412.

The DEF injector assembly 400 has an upstream end 414 and a downstream end 416. A fluid inlet 418 and a fluid outlet 420 extend from the upstream end 414 of the body 406. The fluid inlet 418 is configured to receive a fluid (e.g., DEF) from a fluid storage tank (not shown), and the fluid outlet 420 is configured to return excess fluid to the fluid storage tank. An atomizer 422 extends downward from the body 406 into the DRT and is configured to spray an atomized mist of fluid into the exhaust passage of the DRT. A seal 424 (e.g., a graphite seal) fluidly seals the body 406 to the DRT.

FIG. 4A also illustrates various locations on a DEF injector assembly 400, at which individual maximum temperature requirements are specified. For example, location 426 corresponds to the mounting foot 410 and location 428 corresponds to a valve dome, which a portion of the body 406 that extends downward towards the atomizer 422. Location 430 corresponds to the fluid outlet 420 and location 432 corresponds to the fluid inlet 418. Location 434 corresponds to an upstream surface of the mounting plate 404 and location 436 corresponds to the seal 424 that is configured to fluidly seal the body 406 to the DRT 438 corresponds to an internal temperature sensor positioned within the body 406, and 440 corresponds to a side of the atomizer 422. Finally, 442 corresponds to ambient air 444 at a position of 20 mm from the top cover 408. Table 1 below lists the normalized maximum temperature requirements for locations 426-442 as illustrated in FIG. 4A.

TABLE 1

DEF INJECTOR ASSEMBLY TEMP REQUIREMENTS

| Location | Description | Normalized Max. Temp. (K/K) |
|---|---|---|
| 426 | Mounting Bracket Foot | 95.77 |
| 428 | Valve Dome | 80.97 |
| 430 | DEF Outlet | 72.52 |
| 432 | DEF Inlet | 71.46 |
| 434 | Mounting Plate Surface | 100.00 |
| 436 | Graphite Seal External Surface | 100.00 |
| 438 | Internal Temperature Sensor | 72.52 |
| 440 | Atomizer Side | 95.77 |
| 442 | Ambient Air 20 mm From Housing | 85.20 |

As shown in FIG. 4A and Table 1, DEF injector assemblies 400 have operating requirements that are well below maximum exhaust gas temperatures, which are typically between 450-650° C. To achieve the relatively low operating temperature requirements, DEF injector assemblies 400 often are designed to be cooled by circulating a fluid (e.g., DEF or engine coolant) through the DEF injector assembly 400. In many off-highway applications, DEF injector assemblies 400 are typically located several meters away from the engine, as opposed to other applications in which the DEF injector assemblies 400 are located closer to the engine. Therefore, for many off-highway applications, the DEF injector assemblies are sufficiently cooled by circulating DEF rather than engine coolant. At peak operating conditions, the volume of DEF available to be circulated through DEF injector assembly 400 is decreased because of increased amounts of DEF being injected into the DRT. Such situations can result in the injector assembly 400 overheating, potentially causing permanent damage to the electronics housed therein.

FIG. 4B illustrates various modes of heat transfer to the DEF injector assembly 400. A particularly significant mode of heat transfer to the DEF injector assembly 400 includes radiant heat transfer from surfaces of components that are positioned in the line of sight of the DEF injector assembly 400. Coating such surfaces with the ceramic thermal barrier coating reduces the temperature of such components, thereby reducing the amount of radiant heat transfer from the surfaces of such components to the DEF injector assembly 400.

For example, heat may be transferred to the DEF injector assembly 400 through a surface of an injecting tip of the atomizer 422 (best shown in FIG. 4A), at least portion of which is structured to be positioned through a DRT (e.g., the DRT 110/302/438), through a contact surface of the mounting plate 404, through surfaces of screws or other fasteners 452, and from the ambient environment 444 as illustrated by 456. These modes of heat transfer may be minimized in various ways. In an embodiment, heat transfer is minimized by including an insulating gasket 458 between the injector body 406 and the mounting plate 404. The injector legs 461 may also be coated with the ceramic thermal barrier coating to achieve a certain degree of temperature reduction.

In particular embodiments, radiant heat may be transferred from a surface of a sidewall of the DRT housing (e.g., the DRT 110/302/438) or another aftertreatment component on which the DEF injector assembly is mounted. Coating the ceramic thermal barrier coating on at least the surface of the sidewall of the DRT or any other aftertreatment component on which the DEF injector assembly 400 is mounted may significantly reduce the radiant heat transfer from the surface of the sidewall to the DEF injector assembly 400. Similarly, any other surface of an aftertreatment component having a direct line of sight to the DEF injector assembly may be coated with the ceramic thermal barrier coating so as to reduce radiant heat transfer therefrom to the DEF injector assembly 400.

According to various embodiments, one or more components or portions of the DEF injector assembly 400 are coated with a ceramic thermal barrier coating as described above, to minimize heat transfer through those components. In one embodiment, the ceramic thermal barrier coating is applied to the insulating gasket 458 that is positioned between the injector body 406 and the mounting plate 404. In another embodiment, the ceramic thermal barrier coating is applied to a top (e.g., external) surface 460 of the mounting plate 404, which is further illustrated in FIG. 3D. Referring back to FIG. 3D, the top surface 460 is defined by a rim 462 extending upwards from the top surface 460, thereby defining the top surface 460 and a flange 466 of the mounting plate 404. The top surface 460 of the mounting plate 404 is configured to receive the DEF injector 402. In a further embodiment, only the top surface 460 as defined by the rim 462 is coated with the ceramic thermal barrier coating. In a still further embodiment, the external surface of the injector body 406 is coated with the ceramic thermal barrier coating and the top cover 408 is uncoated. In another embodiment, the ceramic thermal barrier coating is applied to only a bottom surface 468 of the injector body 406. The bottom surface 468 is the surface of the injector body 406 in contact with the mounting plate 404. In a further embodiment, only the mounting surfaces, including the surfaces of the mounting foot 410 and the mounting boss 412 are coated with a ceramic thermal barrier coating. In still other embodiments, the ceramic thermal barrier coating is applied to locations or components of the DEF injector assembly 400, or to any combination of such locations or components.

Based upon testing to evaluate heat transfer in exhaust aftertreatment components such as DEF injector assemblies, it has been determined that the exhaust aftertreatment components that included the ceramic thermal barrier coatings have lower temperatures at various locations on the component assemblies. Notably, the ambient temperature surrounding the components was significantly less for those having ceramic thermal barrier coatings.

Figure 5:
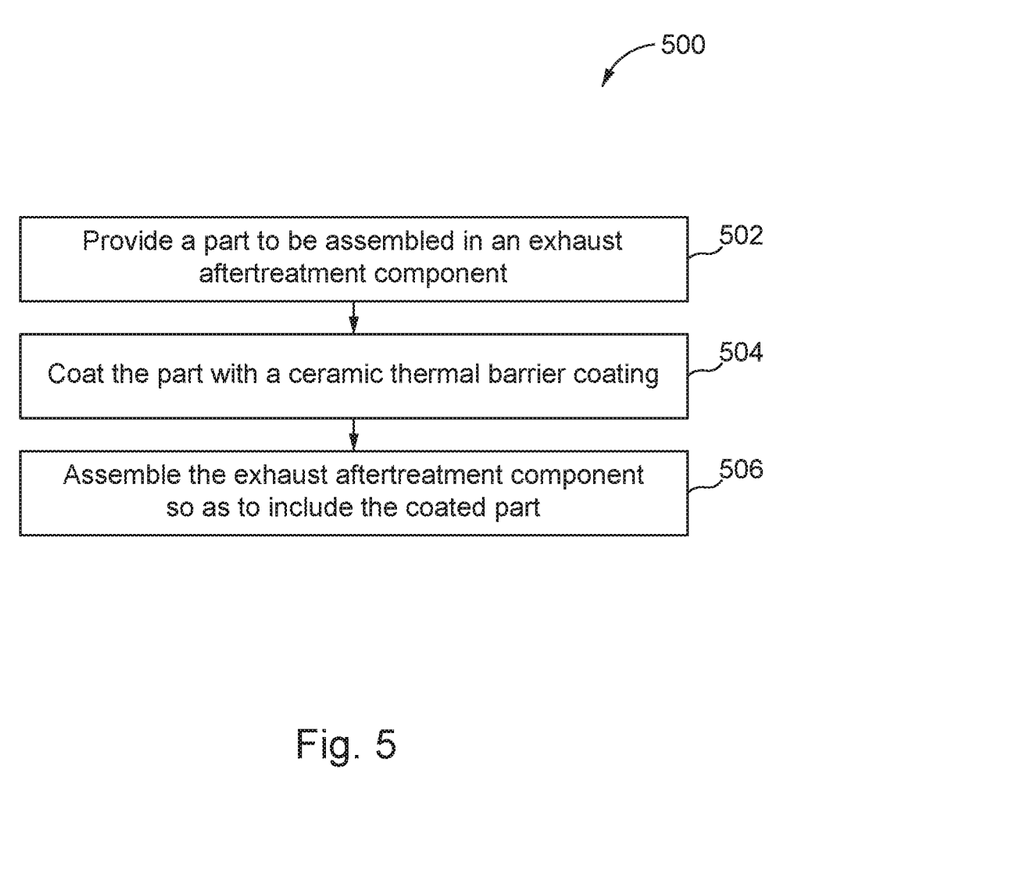
FIG. 5 is a schematic flow diagram of an embodiment of a method for assembling an exhaust aftertreatment component at least a portion of which is coated with a ceramic thermal barrier coating.

FIG. 5 is a schematic flow diagram of an example method 500 of assembling an aftertreatment component. The method 500 includes providing a part to be assembled in an exhaust aftertreatment component at 502. For example, the exhaust aftertreatment component (e.g., the aftertreatment component 200) may include a particulate filter (e.g., the DPF 108), a DRT (e.g., the DRT 110/302/438), a SCR device (e.g., the SCR device 112), an oxidation catalyst (e.g., the DOC 106) and/or a reductant injector assembly (e.g., the reductant injector assembly 300, the DEF injector assembly 400 or the reductant injector 114 described herein).

The part of the exhaust aftertreatment component is coated with a coating of a ceramic thermal barrier material at 504. In particular embodiments, the part can include a housing of the exhaust aftertreatment component at least a portion of which is coated with the ceramic thermal barrier coating. For example, at least a portion of the housing 202 of the exhaust aftertreatment component 200 (e.g., the inlet 204, the outlet 206, the inner wall 208 and/or the outer wall 210 of the housing 202) is coated with the ceramic thermal barrier coating, In various embodiments, the exhaust aftertreatment component includes the reductant injector assembly (e.g., the reductant injector assembly 300, the DEF injector assembly 400 or the reductant injector 114) at least a part of which is coated with the ceramic thermal barrier coating. For example, the DEF injector assembly 400 includes a DEF injector 402 and a mounting plate 404 configured to mount the DEF injector 402 to a DRT of an aftertreatment system. At least a portion of the mounting plate 404 such as an external surface of the mounting plate 404 (e.g., the top surface 460 of the rim 462 included in the mounting plate 404 on which the DEF injector 402 is positionable) is coated with the ceramic thermal barrier coating.

As described before, the DEF injector 402 (or any other reductant injector described herein) may include an injector body 406 structured to be positioned on the mounting plate 404 and a top cover 408 attached to the injector body 406. At least a portion of the injector body 406 may be coated with the ceramic thermal barrier material. For example, an external surface of the injector body 406 (e.g., the bottom surface 468 thereof) may be coated with the ceramic barrier material. In some embodiments, the injector legs 461 extending from the injector body 406 towards the mounting plate 404 are coated with the ceramic thermal barrier coating. In other embodiments, the mounting surfaces of the injector body 406 in contact with the mounting plate 404 (e.g., the surface of the mounting foot 410 and/or the mounting boss 412) are coated with the ceramic thermal barrier coating.

In some embodiments, the reductant injector assembly (e.g., the reductant injector assembly 300, the DEF injector assembly 400 or the reductant injector 114) includes an insulating gasket positioned between a reductant injector and a mounting plate of the reductant injector, which is coated with the ceramic thermal barrier coating. For example, the DEF injector assembly 400 also includes an insulating gasket 458 positioned between the injector body 406 and the mounting plate 404. The insulating gasket 458 is coated with the ceramic thermal barrier coating.

The exhaust aftertreatment component is assembled so as to include the coated part at 506. For example, the various parts of the reductant injector assembly (e.g., the reductant injector assembly 300, the DEF injector assembly 400 or the reductant injector 114), at least some of which are coated with the ceramic thermal barrier coating, are assembled so that the DEF injector assembly 400 includes the coated part.

As described herein, the term "a surface of the exhaust aftertreatment system" refers to any surface of the aftertreatment system which may be coated with the ceramic thermal barrier coating described herein unless context dictates otherwise. Various non-limiting examples of the surface of the aftertreatment system which may be coated with the ceramic thermal barrier coating include a surface of the outer wall 210, a surface of the heat shield 218 or a surface of the mounting bracket 220 of the housing 202, exposed surfaces of inner wall 208 or outer wall 210 of the housing 202 (e.g., located at the interfaces between discrete segments of the internal insulation 214 and/or the external insulation 216) or any other suitable surface of a housing of any aftertreatment component described herein.

In various embodiments, "a surface of the exhaust aftertreatment system" may also include any surface of one or more components of a reductant injector assembly (e.g., the reductant injector assembly 300 or the DEF injector assembly 400). For example, the surface of the aftertreatment system may include a surface of a mounting plate of the reductant injector assembly (e.g., the top surface 460 of the mounting plate 404), a surface of the injector body 406 (e.g., only on a bottom surface 468 of the injector body 406), a surface of the top cover 408, a surface of the foot 410, a surface of the mounting boss 412, a surface of the valve dome 428, a surface of the injector legs 461, a surface of the insulating gasket 458 or any other surface of the reductant injector assembly.

It should be noted that the terms "example" and "exemplary" as used herein to describe various embodiments are intended to indicate that such embodiments are possible examples, representations, and/or illustrations of possible embodiments (and such terms are not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus, comprising:
   a reductant injector assembly comprising a reductant injector, wherein the reductant injector comprises a leg; and
   a ceramic thermal barrier coating coated on at least a surface of the leg of the reductant injector.

2. The apparatus of claim 1, further comprising an oxidation catalyst, wherein the ceramic thermal barrier coating is also applied to a surface of the oxidation catalyst.

3. The apparatus of claim 1, further comprising a particulate filter, wherein the ceramic thermal barrier coating is also applied to a surface of the particulate filter.

4. The apparatus of claim 1, further comprising a decomposition reactor tube, wherein the ceramic thermal barrier coating is also applied to a surface of the decomposition reactor tube.

5. The apparatus of claim 1, further comprising a selective catalytic reduction device, wherein the ceramic thermal barrier coating is also applied to a surface of the selective catalytic reduction device.

6. The apparatus of claim 1, further comprising a housing on which the reductant injector assembly is mounted, and wherein the ceramic thermal barrier coating is also applied to an outer wall of the housing.

7. The apparatus of claim 1, wherein the reductant injector assembly comprises a mounting plate configured to mount the reductant injector assembly to a decomposition reactor tube, and wherein the ceramic thermal barrier coating is applied to a surface of the mounting plate.

8. The apparatus of claim 7, wherein the ceramic thermal barrier coating is applied to only an external surface of the mounting plate among surfaces of the mounting plate.

9. The apparatus of claim 1, wherein the reductant injector assembly comprises an insulating gasket positioned between a mounting plate of the reductant injector assembly and a decomposition reactor tube, and wherein the ceramic thermal barrier coating is applied to a surface of the insulating gasket.

10. The apparatus of claim 1, wherein the ceramic thermal barrier coating is plasma spray coated on the surface of the reductant injector assembly.

11. A method, comprising:
providing a reductant injector to be assembled in a reductant injector assembly, the reductant injector comprising a leg;
spray coating at least a leg of the reductant injector with a ceramic thermal barrier coating; and
assembling the reductant injector assembly such that the reductant injector assembly includes the reductant injector comprising the leg that is spray coated with the ceramic thermal barrier coating.

12. The method of claim 11, further comprising:
providing a particulate filter; and
coating a surface of the particulate filter with the ceramic thermal barrier coating.

13. The method of claim 11, further comprising:
providing a decomposition reactor tube; and
coating a surface of the decomposition reactor tube with the ceramic thermal barrier coating.

14. The method of claim 11, further comprising:
providing a selective catalytic reduction device; and
coating a surface of the selective catalytic reduction device with the ceramic thermal barrier coating.

15. The method of claim 14, further comprising:
providing a housing;
coating the housing with the ceramic thermal barrier coating; and
positioning the reductant injector assembly on the housing.

16. The method of claim 11, further comprising spray coating a mounting plate of the reductant injector assembly with the ceramic thermal barrier coating, the mounting plate configured to mount the exhaust aftertreatment component to a decomposition reactor tube.

17. The method of claim 16, wherein only an external surface of the mounting plate, among surfaces of the mounting plate, is coated by the ceramic thermal barrier coating.

18. The method of claim 17, further comprising spray coating an insulating gasket of the reductant injector assembly with the ceramic thermal barrier coating, the insulating gasket configured to be positioned between the mounting plate of the reductant injector assembly and the decomposition reactor tube.

19. An aftertreatment system, comprising:
an oxidation catalyst;
a particulate filter positioned downstream of the oxidation catalyst;
a decomposition reactor tube positioned downstream of the particulate filter;
a reductant injector assembly operatively coupled to the decomposition reactor tube, the reductant injector assembly comprising a reductant injector, the reductant injector comprising a leg; and
a selective catalytic reduction device positioned downstream of the decomposition reactor tube, the selective catalytic reduction device including a catalyst formulated to decompose NOx gases included in an exhaust gas flowing through the aftertreatment system,
wherein a ceramic thermal barrier coating is coated on at least a surface of the leg of the reductant injector.

20. The aftertreatment system of claim 19, wherein the reductant injector assembly further comprises:
a mounting plate coupled to the decomposition reactor tube, the reductant injector positioned on the mounting plate,
wherein a top surface of the mounting plate on which the reductant injector is positioned is coated with the ceramic thermal barrier coating.

21. The aftertreatment system of claim 20, wherein the reductant injector assembly further comprises:
an insulating gasket positioned between the reductant injector and the mounting plate, the insulating gasket coated with the ceramic thermal barrier coating.

22. The aftertreatment system of claim 20, wherein the reductant injector comprises:
a body positioned on the mounting plate; and
a top cover attached to the body,
wherein at least a portion of the body is coated with the ceramic thermal barrier coating.

23. The aftertreatment system of claim 19, wherein the oxidation catalyst comprises a diesel oxidation catalyst.

24. The aftertreatment system of claim 19, wherein the ceramic thermal barrier coating is plasma spray coated on the reductant injector assembly.

25. An aftertreatment system, comprising:
an oxidation catalyst;
a particulate filter positioned downstream of the oxidation catalyst;
a decomposition reactor tube positioned downstream of the particulate filter;
a reductant injector assembly operatively coupled to the decomposition reactor tube; and
a selective catalytic reduction device positioned downstream of the decomposition reactor tube, the selective catalytic reduction device including a catalyst formulated to decompose NOx gases included in an exhaust gas flowing through the aftertreatment system,
wherein a ceramic thermal barrier coating is coated on the reductant injector assembly,
wherein the reductant injector assembly comprises:
a reductant injector,
a mounting plate coupled to the decomposition reactor tube, the reductant injector positioned on the mounting plate,
a body positioned on the mounting plate, and
a top cover attached to the body,
wherein a top surface of the mounting plate on which the reductant injector is positioned is coated with the ceramic thermal barrier coating, and
wherein at least a portion of the body is coated with the ceramic thermal barrier coating.

26. A reductant injector assembly configured to be operatively coupled to a decomposition reactor tube, the reductant injector assembly comprising:
a reductant injector comprising a body and a top cover attached to the body;
a mounting plate on which the body of the reductant injector is positioned, the mounting plate being configured to be coupled to the decomposition reactor tube; and
an insulating gasket positioned between the reductant injector and the mounting plate;
wherein a ceramic thermal barrier coating is coated on at least (i) a top surface of the mounting plate on which the reductant injector is positioned, (ii) the insulating gasket, and (iii) at least a portion of the body of the reductant injector.

* * * * *